United States Patent
Paulos et al.

(10) Patent No.: US 6,224,927 B1
(45) Date of Patent: May 1, 2001

(54) PROCESS FOR PREPARING BACON CHIPS AND PATTIES

(75) Inventors: William T. Paulos, McFarland; Gregory K. Choate, Madison, both of WI (US)

(73) Assignee: Kraft Foods, Inc., Madison, WI (US)

( * ) Notice: Subject to any disclaimer, the term of this patent is extended or adjusted under 35 U.S.C. 154(b) by 0 days.

(21) Appl. No.: 09/338,159

(22) Filed: Jun. 22, 1999

(51) Int. Cl.$^7$ ............................. A23L 1/314; A23L 1/317
(52) U.S. Cl. ..................... 426/266; 426/272; 426/513; 426/646
(58) Field of Search ........................... 426/646, 513, 426/518, 264, 266, 645, 272

(56) References Cited

U.S. PATENT DOCUMENTS

| | | |
|---|---|---|
| 3,565,637 | 2/1971 | Artar . |
| 3,642,496 | 2/1972 | Gibson . |
| 3,663,233 | 5/1972 | Keszler . |
| 3,890,451 | 6/1975 | Kesler ................................. 426/264 |
| 3,997,672 | 12/1976 | Stead et al. ........................ 426/59 |
| 4,057,650 | * 11/1977 | Keszler ........................... 426/513 X |
| 4,107,337 | 8/1978 | Deppner, Jr. ...................... 426/266 |
| 4,196,222 | 4/1980 | Cheney ............................. 426/264 |
| 4,218,492 | 8/1980 | Stead et al. ....................... 426/646 |
| 4,262,028 | 4/1981 | Meyer et al. ...................... 426/417 |
| 4,305,965 | 12/1981 | Cheney ............................. 426/104 |
| 4,377,597 | 3/1983 | Shapiro et al. ..................... 426/92 |
| 4,567,050 | 1/1986 | Roth .................................. 426/417 |
| 5,482,730 | 1/1996 | Duve ................................. 426/646 |
| 5,690,777 | 11/1997 | Kuethe et al. .................... 156/308.4 |
| 5,925,400 | * 7/1999 | Gundlach et al. ........... 426/646 X |

* cited by examiner

*Primary Examiner*—Arthur L. Corbin
(74) *Attorney, Agent, or Firm*—Cook, Alex, McFarron, Manzo, Cummings & Mehler, Ltd.

(57) ABSTRACT

Bacon chips, bacon patties and bacon pizza topping products are provided from meat sources which include ends and pieces of cured bacon bellies which are bound together by an uncooked meat trimmings binder which has the brine flavor of the bacon ends and pieces and which is preferably porcine. These coarsely ground meat components are shaped and placed into condition for slicing. When sliced to between about 12 and about 16 slices per inch and suitably cooked to a cooking yield of about 25 to about 30 weight percent, cooked bacon chips are provided. When sliced to about 6 to about 10 slices per inch and cooked to a suitable cook yield of between about 35 weight percent and less than about 40 weight percent, bacon patties are provided.

10 Claims, No Drawings

PROCESS FOR PREPARING BACON CHIPS AND PATTIES

BACKGROUND OF THE INVENTION

This invention generally relates to bacon chips or bacon patties and to the manufacture and preparation of such bacon-originating products. More particularly, chips or patties are prepared which are disks of a desired profile, whether circular, oval, rectangular, or other desired plan shape, which disks are cooked into a finished product suitable for incorporation into packaged meals, sandwich components, pizzas, packaged snacks, and the like. The disks are made from ground, processed bacon ends or pieces which are mixed with ground uncooked meat trimmings and a brine solution, which meat mixture is shaped, frozen and sliced into the disks which are subsequently cooked into the bacon chips, patties and the like.

Bacon products originating from pork belly cuts have long been used in food products such as sandwiches, meals, side dishes and the like. Traditionally, these take the form of elongated strips which are sliced from a cured pork belly. While great strides have been made in recent years in order to achieve more uniformity in certain bacon strips, sizing variabilities and inconsistencies still occur, and it is not possible to closely control the shape of the strips or to vary their shape or size to any substantial extent. Weight and size control of precooked whole and partial bacon strips is very difficult because of the originating natural shape of the belly and because the cook level can vary greatly from strip to strip, and even within the same strip. Such inconsistencies are due, in part, to variable fat content, size, and in some instances thickness. These parameters can vary depending upon the source of each particular strip. In addition, the traditional elongated strip shape is not always suitable for all applications, limiting the usefulness of these traditional bacon products, or requiring size-reduction and/or assembly steps in preparing a final desired food product.

Because of these limitations, there has been a desire to be able to provide a precooked bacon product which delivers the true cooked flavor and texture of bacon in a shape and size which can be particularly advantageous for use in meal, sandwich and snack products and the like. In the past, approaches have been taken in order to address these types of needs and desires. Gibson U.S. Pat. No. 3,642,496 describes a method of making a bacon-containing food product. This patent utilizes bacon ends and combines bacon end pieces with additions that are high in protein content and high in albumin content, which combination is shaped into a form suitable for cooking. Requiring a high-albumin component makes such products less than suitable for providing true cooked flavor and texture of bacon. Depner U.S. Pat. No. 4,107,337 describes a sausage product for simulating bacon having two separate components, one being a lean meat appearing component, and the other a fat-appearing component. With this approach, the fat-like component serves as a binder for the lean meat component. The resulting sliced product has an elongated strip shape of a simulated bacon, a non-meat originating binder being included.

According to the invention, suitable bacon chip, bacon patty and the like is provided in cooked form without requiring a binder such as albumin. Products are provided which deliver the true cooked flavor and texture of bacon in a small chip or patty format which is sized and shaped as desired. They incorporate ends and/or pieces of processed, cured bacon which are traditional byproducts of bacon processing and slicing carried out during industrial-scale bacon packaging operations.

SUMMARY OF THE INVENTION

Cooked bacon disks are prepared from a meat mixture which has ground processed bacon ends as its primary component. This meat mixture also includes a substantial quantity of an uncooked ground meat trimmings binder and a brine solution. Included is a process which incorporates bacon ends or pieces of bacon bellies which have been processed from uncooked bacon bellies by curing, cooking and smoking and chilling. These processed ground ends or pieces are mixed with uncooked meat trimmings having a fat percentage between about 5 and about 60 weight percent, together with a brine solution to form the bacon meat mixture, which is shaped and frozen so as to provide a sliceable shaped meat stick. This stick is then sliced so as to form a plurality of slices which are then cooked into bacon disks which can take the form of bacon chips, bacon patties, bacon pizza topping and the like having a geometric shape which need not be that of a conventional, natural bacon strip. The present products can take on shapes including circular, oval, rectangular and the like.

It is accordingly a general object of the present invention to provide improved products having the cooked flavor and texture of bacon in a small chip or patty format.

Another object of this invention is to provide an improved process and product produced thereby, which process shapes a meat mixture having at least 50% by weight of ground processed bacon ends.

Another object of the present invention is to provide improved cooked bacon products in the form of chips which are generally disk-like and which are suitable for inclusion within packaged meal products.

Another object of this invention is to provide improved cooked bacon patties which are suitable for use as sandwich components.

Another object of the present invention is to provide small chips suitable for use as a bacon pizza topping or for use as a packaged snack item.

These and other objects, features and advantages of the present invention will be apparent from and clearly understood through a consideration of the following detailed description.

DESCRIPTION OF THE PREFERRED EMBODIMENTS

The term bacon disks is used generally herein to include relatively thin, cooked bacon products including bacon chips and bacon patties. The former are especially thin and well suited for use as components of meals, sandwiches, packaged snacks, pizza toppings and the like. Bacon patties are typically thicker and are more suitable for use as a cooked sandwich meat. The patties have a less crisp, more chewy consistency, combined with a lighter colored appearance, whereas the chips are crispy and darker in color. A chip type of product will have a thickness, prior to final cooking, of about $\frac{1}{12}$ to about $\frac{1}{16}$ of an inch, whereas the patties are of a thickness of between about $\frac{1}{6}$ and about $\frac{1}{10}$ of an inch prior to final cooking.

The other primary shape parameter of the bacon disks are surface shape and size. A common shape is circular, this shape being typical of disks made by transversely slicing the bacon product which has been formed by stuffing into a casing. Other bacon disk shapes are readily obtained by appropriately shaping the meat material with a suitable shaping means, such as a mold, non-circular casing, forming device and the like. Shapes in this regard include oval, rectangular, square and other shapes such as those which are multi-faceted or shaped so as to conjure up a particular brand or character. It will be understand that reference to a bacon disk, unless otherwise noted, encompasses these shapes and thicknesses, even though specific reference generally may be made to circular chips or patties.

In the preferred embodiment which is illustrated, ends and pieces are used which are low-value byproducts from the preparation and slicing of natural bacon slices. As generally recognized in the bacon industry, bacon ends and pieces typically are non-standard slices or docked butt ends having dimensions less than that needed for a standard bacon slice or strip. Other non-standard slices include those having dark tissue or a seed appearance, or other undesirable characteristics.

These ends and pieces are size reduced, for example ground and/or diced, so as to overall reduce the size of these bacon ends and pieces. Typical size reduction is by grinding through a plate having an opening size of between about ⅛ inch and about ½ inch. A preferred ground size is approximately ¼ inch.

The bacon ends and/or pieces are products of normal industrial-scale bacon preparation. They are portions of porcine bellies which have been processed into bacon bellies by pumping with brine to cure over time, followed by a cooking and smoking operation. Chilling follows. These are cooked to the extent so that the bacon is back to its green weight, or reduced further in weight. When the thus processed bacon bellies are subsequently sliced, the bulk of the sliced belly slices preferably qualify as number one sliced drafts. The remnants are bacon ends and pieces which, while wholesome, do not have the appearance which has come to be expected of sliced bacon.

If desired, the bacon ends and/or pieces optionally can be further cooked before or after they are collected as a byproduct. Such cooked bacon ends or pieces which are incorporated into the mixture with the meat binder will have a cook level as desired. Cook level refers to the weight percentage of the cooked ends and/or pieces, based upon the original weight of the processed ends and/or pieces. In those instances where it is desired to have a more fully cooked bacon source, the ends and/or pieces can be further cooked prior to mixing with the meat binder. A fully cooked, ready-to-eat bacon product has a cook level of 40 weight percent or less, whereas a partially cooked bacon product will have a cook level of above 40 weight percent. Whether fully cooked or partially cooked, the bacon ends or pieces used will have achieved an internal temperature of at least 130° F. (54.4° C.) and thus do not fall within the category of fresh meat. It will be understood that rework processed bacon ends and pieces also can be used.

Uncooked meat trimmings comprise the other primary component of the meat products according to the invention, the meat binder. Uncooked and raw meat trimmings are ground and cured to a cure level substantially equal to that of bacon. The result is a binder of meat trimmings which coordinates with the brine level or cure level of the other primary component, the ground bacon ends and pieces. Suitable meat trimmings are 72 ham trim, belly trim, and the like. It will be appreciated that 72 ham trim has a fat content of approximately 28 weight percent. The meat trimmings for this component can have a fat level of between about 5 weight percent and about 60 weight percent fat, preferably less than about 40 weight percent fat, and most preferably below about 30 weight percent fat. It is preferred that porcine meat be used so that the product can be identified entirely as a pork product when desired. The use of belly trim may be beneficial in being able to indicate that the product originated solely from bellies or bacon components.

It is generally advantageous to mix the raw meat trimmings in the presence of the brine solution. Grinding typically is between about ⅛ inch and about ½ inch, a preferred target grind being approximately ¼ inch.

A brine solution can be referred as a cure solution or a pickle solution. The primary component of such solutions is water. Other principal components are salt and sugar. Minor components can be included such as smoke flavoring agents, sodium phosphates, sodium erythorbate, and sodium nitrite. In the normal course of nitrite treatments, sodium erythorbate is a required component. Binder components such as albumin and the like are not required in either the brine solution or other components of the products according to the invention.

Curing with the brine solution will proceed for a length of time which assures that the brine is properly absorbed with the raw meat trimmings so as to cure them properly. Typically, such curing will be at about 40° F. (4.4° C.). Typical cure times will be between about one hour and 24 hours. In the preferred approach, the brine solution used to cure the raw meat trimmings is substantially identical to the brine which had been used in curing the bacon bellies from which the bacon ends and/or pieces originated. Preferably, the brine will impart to the meat trimmings a cured taste which is substantially that of the bacon ends and/or pieces.

The amount of brine used should render the eventually prepared bacon meat mixture to be fluid enough so as to be suitable for a subsequent forming operation. For example, if the bacon meat mixture is to be shaped by a casing, the brine content should render the bacon meat mixture fluid enough so as to be easily stuffable, that is not firm or stiff. Other shaping approaches such as extrusion or molding might perform better at greater or lesser fluid or moisture levels, which will be generally appreciated in the art.

The size-reduced bacon ends and/or pieces are mixed with the cured binder of meat trimmings in order to form a bacon meat mixture of the desired consistency. This bacon meat mixture has between about 50 weight percent and about 80 weight percent of the size-reduced processed bacon ends and/or pieces and between about 20 weight percent and less than 50 weight percent of the cured meat trimmings binder. The brine solution of the cured binder of meat trimmings comprises between about 8 weight percent and not more than 30 weight percent. With further reference to the size-reduced bacon ends and/or pieces, a preferred range is between about 50 and about 70 weight percent. It will be understood that quantities above about 70 weight percent may be especially suitable when a leaner meat trimmings binder is used. Each of these weight percents is based upon the total weight of the bacon meat mixture formed from these components.

After shaping is accomplished by stuffing the bacon meat mixture into a casing, by extruding, by inserting into a mold or the like, the bacon meat mixture sets up so as to be easily handled and sliceable. Often, this involves reducing the temperature. The temperature reduction should be suitable to assist in the subsequent slicing of the shaped meat product. This can take the form of either freezing or crust chilling the shaped meat product. Freezing to a hard frozen condition is preferred so as to reduce the internal temperature of the shaped meat to between about 0° F. and about 18° F., preferably between about 5° F. and about 15° F. (between about −18° C. and −8° C., preferably between about −15° C.

to about −9° C). When crust chilling is to be carried out, only an outside perimeter layer of the shaped meat is actually frozen, while the central portion is well chilled but not necessarily brought to a frozen state. Whatever approach is used, the meat mixture at this stage takes on the form of a sliceable shaped meat stick.

Next, the sliceable shaped meat stick is subjected to slicing. At this stage, a choice is to be made as to whether the final disk-shaped product is to be a product in the nature of a chip or a product in the nature of a patty. The preferred embodiment is the bacon chip type of product. In this embodiment, the slicing equipment is set so as to cut about 12 to 16 slices per inch of the sliceable shaped meat stick. Preferably, this slicing will be at about 14 to 15 slices per inch. After subjecting these slices to the subsequent cooking step, thin and crispy bacon disks, or bacon chips, are prepared.

When the bacon patty embodiment is desired, the sliceable shaped meat stick will be sliced at about 6 to about 10 slices per inch, preferably about 8 to 9 slices per inch. After undergoing the subsequent cooking step, these slices are formed into bacon disks, or bacon patties, which are tougher, more chewy and lighter in color than are the bacon chips according to the preferred embodiment.

Whatever slicing approach is used, it can be accomplished by suitable commercially available slicing equipment for slicing large sticks of meat or other food products. Included is slicing equipment available from Cashin, Formax, Grote, and others.

Slices formed as noted above are next subjected to cooking. In order to facilitate commercial-scale production, it is preferred that the cooking take place on or in association with a conveyorized system. Conveyorized microwave cooking systems are preferred. In addition to microwave cooking approaches, deep fat frying is possible such as in a hot oil bath with a screen belt, although this can create unnecessary complications in terms of added fat, as well as in terms of the ability to convey the disks by means of a supportive surface. Other approaches are suitable, such as the use of plate fryers which sandwich the item being cooked between conveying platens. Another approach is the use of conveyor impingement oven equipment such as those used in baking crackers and the like. This latter approach can be particularly useful when the bacon disk is to be in form of a bacon chip having a waffled appearance on the order of that of a potato chip and the like.

Whatever cooking approach is used, the extent of cooking is defined conveniently in accordance with a percentage yield. In order for a bacon product to be classified as fully cooked under controlling USA governmental regulations, that is those of the United States Department of Agriculture, the weight percent of the cooked chip in accordance with the invention must be 40 weight percent or less of the total weight percent of the sliceable shaped meat stick, that is the weight of the slices going into the cooking unit.

General overall cooking yields can be between about 25 and about 60 weight percent. When the cooked disks are to be in the nature of a bacon chip product, the cook yield typically will be between about 25 weight percent and about 30 weight percent. For the bacon patty type of product, the cook yield will be between about 30 weight percent and about 35 weight percent. A cook yield of between about 25 and about 32 weight percent tends to provide a product with acceptable shelf stability attributes. A pizza topping product would have a cook yield between about 35 and about 60 weight percent.

The final product which is prepared should have a water activity which is equal to or less than about 0.85 $a_w$. When sealed within suitable modified-atmosphere packaging, this water activity level contributes to providing adequately shelf stable meat products.

In another embodiment, the percentage yield can be in the area of about 40 weight percent to 60 weight percent when it is desired to provide a partially cooked bacon disk. The resulting product typically will have a water activity level greater than about 0.85 $a_w$. The resulting partially cooked disk will be more in the nature of a typical sausage product. These partially cooked disks can find special application as toppings for pizzas which could be subjected to subsequent cooking prior to consumption.

Typically, after the cooking step, the cooked bacon disks will be air chilled in order to remove excess fat and to chill the disks to below 40° F. (4.4° C.) prior to packaging. The cooled, cooked disks are filled into packages and hermetically sealed in modified atmosphere packaging as appropriate for the particular product. Vacuum packaging is suitable for certain products. For many others, gas flushing with a suitable gas such as a mixture of nitrogen and carbon dioxide is quite suitable. Packaging can be such that a plurality of the cooked disks are hermetically sealed within a pouch, either alone or mixed with other snack items. Also, the cooked bacon disks can be included within packaged meals as a component of a meal to be consumed cool, unheated or heated, depending upon the particular tastes of the consumer or heating equipment available to the consumer. For example, the cooked bacon chips according to the invention can be included within a packaged meal as disclosed in U.S. Pat. Nos. 5,747,084, 5,657,874, 5,375,701, 5,312,634, 5,123,527, and 5,119,940, incorporated hereinto by reference.

It will be appreciated that one advantage of the present invention is the ability to provide bacon disks which are sized and shaped according to the particular end need to be addressed by the product. For example, a bacon disk for use as a component of a bacon and beef burger sandwich can be made to a size and shape so as to conform to that of the beef burger component and/or of the bun component of the sandwich meal product. These could be of a generally circular shape or of a square shape so as to conform to that of the beef burger component and/or bun component. Smaller cooked bacon disks might be more suitable when the bacon disk is to be used as a meat component of a breakfast meal, for example. Such products typically would be circular and have a diameter of between about 1.5 inch and about 2 inches. Bacon chip products might be more suitably of the bite-sized variety, which could be as small as about one inch in diameter or other major dimension of non-circular bacon disks. Practically speaking, a bacon disk product according to the invention would have a diameter or other major width component of between about one inch (2.54 cm) and about 5 inches (12.7 cm).

In addition to the fact that the present invention allows the producer to select bacon disk thickness and overall size, the processor can control weights and cook levels, together with associated texture and appearance characteristics. Whatever choices are made, the product delivers true bacon flavor and texture. Also because of the ability for the bacon disks to be uniform in size and weight, they can be handled on conventional conveyor systems and can flow through automated systems for cooking, weighing, counting, dispensing and package filling.

Illustrations of the disclosure herein are provided by the following Examples.

EXAMPLE 1

Bacon chips which are a bacon and ham product, fully cooked, cured, chopped and formed, were prepared with a formula comprising a mixture of 51.0 pounds of cured, cooked and smoked, and chilled bacon ends and pieces, and 49.0 pounds of 72 ham trim (28% fat) cured with 5.88 pounds of brine solution which comprised about 12% brine for the 72 ham trim. The bacon ends and pieces and the 72 ham trim were passed through a grinder set at ¼ inch. This was mixed and stuffed into casings having a diameter of 1.75 inch, this batter being fluid enough to be stuffed well. The stuffed and thus shaped meat mixture was placed into a freezer environment at 0° F. (−17.8° C). After slicing, the slices were cooked within a deep fat fryer which was maintained at a frying temperature of between about 265° F. and about 275° F. (about 129.4° C. to about 135° C.). The water activity of the resulting bacon chips was 0.646.

EXAMPLE 2

Bacon chips were prepared generally in accordance with Example 1, except the meat ingredients were as follows. Fifty-one pounds of bacon ends and pieces and 25 pounds of 72 ham trim were ground to ¼ inch, and 24 pounds of 85 shank trim were ground to 3/16 inch. After processing and cooking, the bacon chips provided were leaner and more in the nature of a low fat bacon chip.

EXAMPLE 3

A formulation similar to that of Example 1 and containing 51% by weight of bacon ends and pieces was processed in generally the same manner, except the cooking was accomplished by twice passing the plurality of slices from the shaped stick through a microwave oven. The resulting bacon chips had a water activity of 0.61. They analyzed as being 12 weight percent moisture, 41.7 weight percent protein and 37.1 weight percent fat.

EXAMPLE 4

Bacon ends and pieces were ground to ¼ inch to provide a source having 45% fat. Fifty-one pounds of these ground processed ends and pieces were mixed with 49 pounds of 72 ham trim and 5.88 pounds of pickle solution. The resulting product had a fat percentage of 36.67 weight percent. This meat mixture was shaped, frozen and sliced at 14 slices per inch and cooked on a microwave bacon line. The thus produced bacon disks were soft and chewy.

EXAMPLE 5

The sliceable shaped meat stick prepared in accordance with Example 4 was essentially duplicated, except it was sliced at a rate of 15 slices per inch. Microwave cooking was carried out. In one instance, the cooking was such that the cook yield was 30% and the resulting chips were somewhat chewy and had some pinkish coloration and had some ham-like flavor notes. Other slices were cooked to a cook yield of 27% to provide bacon chips having a crispy texture and more brown in color and more bacon-like in flavor when compared with those at the 30% cook yield.

EXAMPLE 6

Bacon chips were prepared from a formulation of ¼ inch ground processed bacon ends and pieces having a fat percentage of 45 weight percent. Sixty pounds of these were combined with 40 pounds of ¼ inch ground 72 ham trim pickled with 4.8 pounds of brine solution. Mixing was under vacuum for four minutes at 45 rpm. These were stuffed into 4½ inch casings and frozen to 0° F. (−17.8° C.) or below for subsequent cooking into large bacon chips.

EXAMPLE 7

A meat mixture as noted in Example 6 was mixed at approximately 45 rpm for four minutes under vacuum and then stuffed into 1.75 inch casings which were frozen to at least 0° (−17.8° C.) until hard enough for slicing. Multiple batches totaling 628.8 pounds of meat mixture, after slicing and cooking provided a plurality of chips having a total weight of 157 pounds, calculating to a cook yield of 25%.

EXAMPLE 8

Bacon ends and pieces ground through a ¼ inch plate, as was 72 ham trim. Sixty pounds of the processed bacon ends and pieces were combined with 40 pounds of the ham trim and 4.8 pounds of pickle curing solution. These components were added to a paddle mixer and mixed for four minutes at 32 rpm. After cure, the resulting batter was stuffed into 1.75 inch diameter casings, which stuffed casings were placed on a rack within a blast freezer, followed by holding in a tempering cooler, with the temperature of the environment being no greater than 10° F. (−12.2° C.) during freezing and tempering. The sticks became hard enough to be sliced. The casings were removed, and the sticks were sliced in a Grote slicer after docking the butt ends to assure only full diameter round slices were provided. Slicing was at 15 slices per inch. The resulting slices were passed to a microwave conveyor and cooked so as to provide a cook yield of 27.5 weight percent, the cook yield being calculated on the basis of product out of the slicer as the uncooked weight when compared with the cooked weight of the resulting bacon chips. The chips had a diameter ranging between about 0.75 inch and about 1.25 inch. They were hermetically sealed within modified atmosphere packaging. These products were analyzed to have a moisture content of about 22%, a protein content of about 36%, and a fat content of about 35%. The product contains no allergens such as egg and egg products, milk and milk products, peanut and peanut products, or wheat and wheat products.

It will be understand that the embodiments of the present invention which have been described are illustrative of some of the applications of the principles of the present invention. Numerous modifications may be made by those skilled in the art without departing from the true spirit and scope of the invention.

What is claimed is:

1. A process for providing cooked bacon disks, comprising:

providing byproduct pieces of processed, cured bacon bellies, said byproduct pieces being processed bacon ends or pieces;

grinding said byproduct pieces to between about ⅛ inch and about ½ inch grind size in order to prepare ground byproduct cured pieces;

providing uncooked meat trimmings having a fat percent between about 5 and about 60 weight percent, based upon the total weight of the meat trimmings, and grinding said meat trimmings to between about ⅛ inch and about ½ inch grind size to provide ground uncooked meat trimmings;

selecting a brine solution having at least water, salt, sugar and a nitrite-containing component;

mixing together, in the absence of an albumin binder component, said ground bacon byproduct cured pieces, said ground, uncooked meat trimmings, and said brine solution to form a cured bacon meat mixture without an albumin binder, said mixture having between about 50 and about 80 weight percent of said ground bacon byproduct pieces, between about 20 and less than 50 weight percent of said ground uncooked meat trimmings, and between about 8 about 20 weight percent of said brine solution;

shaping said cured bacon meat mixture and reducing its temperature to provide a sliceable meat stick;

slicing said shaped sliceable meat stick so as to form a plurality of slices; and cooking said slices into cooked bacon disks.

2. The process in accordance with claim 1, wherein said cooking produces bacon disks having a cook yield of between about 25 weight percent and about 40 weight percent, based upon the weight of the slices after slicing and prior to cooking.

3. The process in accordance with claim 1, wherein said cooking produces bacon disks having a cook yield of between about 40 weight percent and about 60 weight percent, based upon the weight of the slices after slicing and prior to cooking.

4. The process in accordance with claim 1, wherein said slicing reduces the meat stick to between about 6 and about 16 slices per inch of the stick.

5. The process in accordance with claim 1, wherein said slicing reduces the meat stick to between about 12 and about 16 slices per inch, said cooking of the slices provides a cook yield of between about 25 and about 30 weight percent, based upon weight of the slices, and said bacon disks are bacon chips.

6. The process in accordance with claim 1, wherein said slicing reduces the meat stick to between about 6 and about 10 slices per inch, said cooking of the slices provides a cook yield of between about 35 and less than 40 weight percent, based upon weight of the slices, and said bacon disks are bacon patties.

7. The process in accordance with claim 1, wherein said cooking reduces the water activity of the bacon disk to not greater than 0.85 to provide shelf-stable bacon disks.

8. The process in accordance with claim 1, wherein said providing of uncooked meat trimmings provides meat trimmings having not greater than about 40 weight percent fat.

9. The process in accordance with claim 1, wherein said providing of uncooked meat trimmings provides meat trimmings having not greater than about 30 weight percent fat.

10. The process in accordance with claim 1, wherein said providing of uncooked meat trimmings provides meat trimmings having not greater than about 30 weight percent fat, said uncooked meat trimmings being porcine.

* * * * *

UNITED STATES PATENT AND TRADEMARK OFFICE
CERTIFICATE OF CORRECTION

PATENT NO. : 6,224,927 B1  
DATED : May 1, 2001  
INVENTOR(S) : Paulos et al.

Page 1 of 1

It is certified that error appears in the above-identified patent and that said Letters Patent is hereby corrected as shown below:

Column 6,  
Line 48, delete "inch" and insert -- inches --.

Column 7,  
Line 122, delete "inch" and insert -- inches --.

Column 9,  
Line 9, delete "8 about 20" and insert -- 8 and 20 --.

Signed and Sealed this

Eighteenth Day of December, 2001

Attest:

Attesting Officer

JAMES E. ROGAN  
Director of the United States Patent and Trademark Office